A. H. CROZIER.
CAR-STARTER.
No. 172,915. Patented Feb. 1, 1876.
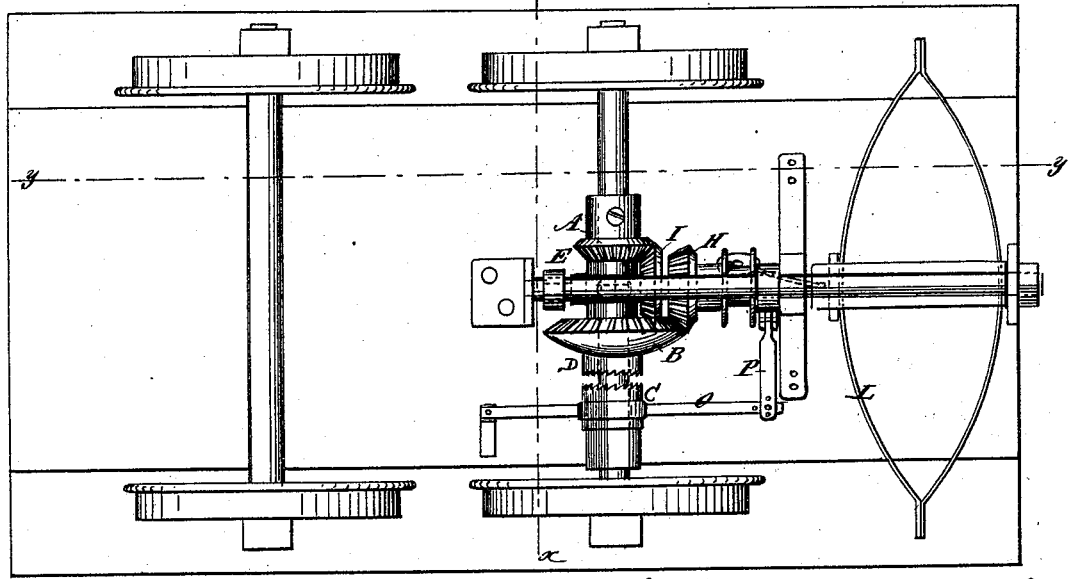
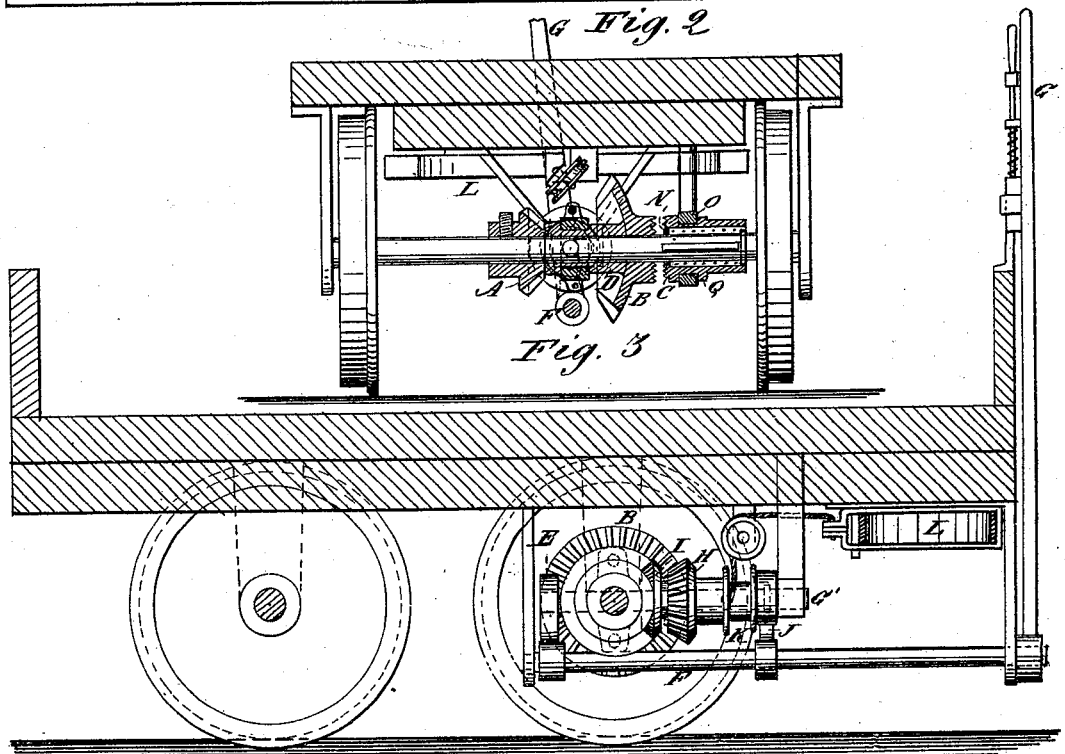
WITNESSES:
O. Neveux
Alex F. Roberts
INVENTOR:
A. H. Crozier
BY
[signature]
ATTORNEYS.

UNITED STATES PATENT OFFICE.

ARCHIBALD H. CROZIER, OF CARLYLE, ILLINOIS.

IMPROVEMENT IN CAR-STARTERS.

Specification forming part of Letters Patent No. 172,915, dated February 1, 1876; application filed November 19, 1875.

*To all whom it may concern:*

Be it known that I, ARCHIBALD H. CROZIER, of Carlyle, in the county of Clinton and State of Illinois, have invented a new and Improved Combined Car Brake and Starter, of which the following is a specification:

The invention consists of an arrangement of apparatus of novel contrivance, whereby a spring is employed as the brake to stop the car, and as a means of starting it again by the power expended in stopping it, and which is stored up in the spring.

Figure 1 is a plan of the bottom of a car having my improved brake and starter. Fig. 2 is a transverse section taken on line $x\ x$, and Fig. 3 is a longitudinal sectional elevation taken on the line $y\ y$ of Fig. 1.

Similar letters of reference indicate corresponding parts.

A is a bevel-wheel, keyed fast to one of the car-axles, and B is another wheel facing it, but fitted so as to turn and slide on the axle, and having a rose-clutch, C, for connecting to the axle, so as to turn it, when desired; it also has a sleeve, D, extending nearly to wheel A, and coupled by a crotched arm, E, with the rock-shaft F, by which the driver shifts the gear, as required, for stopping and starting, using the lever G, which extends up to his place from the front end of the shaft. The sleeve D is also the bearing for one end of the shaft G', on which is a wheel, I, for gearing with wheel A; also a wheel, H, for gearing with wheel B, and also a driver, K, for winding up a spring or springs, L, and which has its other bearing in the arm J of a rock-shaft, F, so that by the oscillating of the rock-shaft the shifting is effected. When wheel I gears with wheel A it winds up the spring, which thus exerts its force to stop the car, the wheel B being at this time disconnected from clutch C. When shaft G' is shifted so that wheel I is thrown out of gear with wheel A, and wheel B is engaged with its clutch, the spring reacts and expends its force in starting the car. The wheel B is larger than wheel A, and thus affords greater leverage to the power of the spring in starting than it has in stopping. In order that the spring shall not be let free by the escape of wheel B from clutch C, or wheel I from wheel A before engaging on the opposite side, the clutch C is made to move forward with wheel B until I engages with A; but it is stopped by a stud-pin at N, so that when wheels I and A are brought fully into gear the wheel B escapes from the clutch sufficiently to run freely, and in shifting the other way the wheel B engages with the clutch before I escapes from A. This may be accomplished by different arrangements of means; but in this case the clutch is made to move with the wheel B—that is, in the same direction at the same time—but to go slower, so that the wheel passes away from it going one way, and catches up to it going the other way, the movement of the clutch being effected by the lever O, which is connected at its swinging end to the arm J by the link P. The stud-pin is used only to make sure that the clutch will not catch the wheel B when stopping the car. A coiled spring, Q, in the hub of the clutch presses it forward to the wheel B or stop-pin, and takes up any lost motion there may be in consequence of stopping it, while the wheel B continues to move.

Having thus described my invention, I claim as new and desire to secure by Letters Patent—

1. The combination, with spring L and axle-pinion A, of shaft G, having drum K and wheels H I, and sliding clutch-sleeve D having wheel B, the sleeve and shaft being connected together so as to be simultaneously moved by the same rock-shaft in the manner described.

2. The combination, with wheels A B H I, of sleeves C D, moving together in the same direction, for the purpose set forth.

3. The lever O, attached to sleeve C and connected by parts J P with the sliding shaft G, as and for the purpose specified.

ARCHIBALD H. CROZIER.

Witnesses:
M. E. RICHARDS,
JOHN LAWREY.